United States Patent
Jia

(10) Patent No.: US 10,225,684 B2
(45) Date of Patent: Mar. 5, 2019

(54) INFORMATION PROCESSING METHOD AND ELECTRONIC DEVICE THEREOF

(71) Applicants: BEIJING LENOVO SOFTWARE LTD., Beijing (CN); LENOVO (BEIJING) LIMITED, Beijing (CN)

(72) Inventor: Jinhong Jia, Beijing (CN)

(73) Assignees: BEIJING LENOVO SOFTWARE LTD., Beijing (CN); LENOVO (BEIJING) LIMITED, Beijing (CN)

(*) Notice: Subject to any disclaimer, the term of this patent is extended or adjusted under 35 U.S.C. 154(b) by 150 days.

(21) Appl. No.: 14/586,676

(22) Filed: Dec. 30, 2014

(65) Prior Publication Data

US 2015/0312710 A1 Oct. 29, 2015

(30) Foreign Application Priority Data

Apr. 29, 2014 (CN) .......................... 2014 1 0178815

(51) Int. Cl.
*H04W 4/02* (2018.01)

(52) U.S. Cl.
CPC .................................... *H04W 4/02* (2013.01)

(58) Field of Classification Search
CPC ....................................................... H04W 4/02
See application file for complete search history.

(56) References Cited

U.S. PATENT DOCUMENTS

| | | | | |
|---|---|---|---|---|
| 2009/0005076 A1* | 1/2009 | Forstall | .................. | G06Q 30/02 455/456.2 |
| 2010/0291950 A1* | 11/2010 | Lin | .......................... | H04W 4/02 455/456.3 |
| 2016/0300299 A1* | 10/2016 | Votaw | .................... | G06Q 50/01 |

* cited by examiner

*Primary Examiner* — Marcos T Torres

(57) ABSTRACT

An information processing method and an electronic device are provided. The method can be applied to an electronic device and comprises: receiving first information that contains first characteristic information; acquiring first location information corresponding to a first location where the electronic device is located; correlating the first location information with the first information; outputting the first information and the first location information in response to that a first operation for reviewing the first information is detected.

13 Claims, 7 Drawing Sheets

INFORMATION PROCESSING METHOD AND ELECTRONIC DEVICE THEREOF

CROSS REFERENCE TO RELATED APPLICATIONS

This application claims the benefit and priority of a Chinese Patent Application Serial Number 201410178815.9 filed on Apr. 29, 2014, which is incorporated herein by reference.

TECHNICAL FIELD

The disclosure relates to the field of electronic technique, and particularly to an information processing method and an electronic device thereof.

BACKGROUND

With the development of electronic techniques, electronic devices can receive information and interact with other electronic devices, bringing convenience in people's activities and life.

For example, when a user conducts a payment transaction, financial agency such as a bank may send information to a mobile terminal associated with the user for notification or confirmation, thereby ensures the security of payment.

Nevertheless, information contained in some important information received by the electronic device is limited, for example, the information may contain only the amount of change of a bank card, and thus it is hard for a user to know, from the received information, details of an event associated with the information after a period of time.

SUMMARY

The disclosure provides an information processing method and an electronic device.

An aspect of the disclosure provides an information processing method for use in an electronic device comprising: receiving first information that contains first characteristic information; acquiring first location information corresponding to a first location where the electronic device is located; correlating the first location information with the first information; and outputting the first information and the first location information in response to that a first operation for reviewing the first information is detected.

In an embodiment, correlating the first location information with the first information comprises: determining first additional information corresponding to the first information according to the first location information, wherein the first additional information comprises information related to a first agency; and correlating the first location information and the first additional information with the first information.

In an embodiment, outputting the first information and the first location information in response to that a first operation for reviewing the first information is detected comprises: outputting the first information, the first location information and the first additional information in response to that the first operation is detected.

In an embodiment, determining first additional information corresponding to the first information according to the first location information comprises: sending the first location information and the first characteristic information to a second electronic device; receiving the first additional information sent from the second electronic device, wherein the first additional information is determined according to the first location information and the first characteristic information.

In an embodiment, determining first additional information corresponding to the first information according to the first location information comprises: positioning in an electronic map at least one agency related to the first information according to the first characteristic information; positioning in the electronic map the first location according to the first location information; determining, among the at least one agency in the electronic map, an agency with the shortest distance from the first location as the first agency; and acquiring information related to the first agency.

In an embodiment, after acquiring the information related to the first agency, the method further comprises: marking the first information at the first location in the electronic map.

In an embodiment, the method further comprises: updating data of the electronic map on the electronic device according to the first location information and the information related to the first agency.

In an embodiment, updating data of the electronic map comprises: determining whether the information related to the first agency in the electronic map matches the first location information or not; updating a location of the first agency in the electronic map to the first location, if the information related to the first agency in the electronic map does not match the first location information.

Another aspect of the embodiments of the disclosure provides an electronic device comprising: a characteristic information determining module configured to determine whether first information received by the electronic device contains first characteristic information or not; a location information acquiring module configured to acquire first location information corresponding to a first location where the electronic device is located; a correlating module configured to correlate the first location information with the first information; a responding module configured to output the first information and the first location information in response to that a first operation for reviewing the first information is detected.

In an embodiment, the electronic device further comprises: an additional information determining module configured to determine first additional information corresponding to the first information according to the first location information, wherein the first additional information comprises information related to a first agency.

In an embodiment, the correlating module is further configured to correlate the first additional information with the first information.

In an embodiment, the responding module is further configured to output the first information, the first location information and the first additional information in response to that the first operation is detected.

In an embodiment, the additional information determining module comprises: a first sending unit configured to send the first location information and the first characteristic information to a second electronic device; and a first receiving unit configured to receive the first additional information sent from the second electronic device, wherein the first additional information is determined by the second electronic device according to the first location information and the first characteristic information.

In an embodiment, the additional information determining module comprises: a first positioning unit configured to position in an electronic map at least one agency related to the first information according to the first characteristic information; a second positioning unit configured to position in the electronic map the first location according to the first location information; a first determining unit configured to determine, among the at least one agency in the electronic map, an agency with the shortest distance from the first location as the first agency; a first acquiring unit configured to acquire the information related to the first agency.

In an embodiment, the electronic device further comprises: a first processing unit configured to mark the first information at the first location in the electronic map.

In an embodiment, the electronic device further comprises: a map data updating module configured to update data of the electronic map on the electronic device according to the first location information and the information related to the first agency.

In an embodiment, the map data updating module comprises: a second determining unit configured to determine whether the information related to the first agency in the electronic map matches the first location information or not; a first updating unit configured to update a location of the first agency in the electronic map to the first location if the information related to the first agency in the electronic map does not match the first location information.

DETAILED DESCRIPTION

The disclosure provides an information processing method and an electronic device thereof for addressing the technical problem in the prior art that it is hard for a user to know, from specific information received by the electronic device, details of an event correlated with the information. This solution enables the user to know the related event's details by adding location related information to the received information and thus providing the user with location information when the information was received.

The solutions of the disclosure will be explained in detail below in conjunction with the accompanying figures and the embodiments. It should be understood that the embodiments of the disclosure and specific features thereof are detailed descriptions of the solutions of the disclosure, rather than limitations to them. The embodiments of the disclosure and the technical features thereof may be combined with each other if there is no conflict.

Embodiment 1

The disclosure provides an information processing method for use in an electronic device according to Embodiment 1. Particularly, the electronic device may be a device such as a smart phone, a tablet computer, a smart watch, etc. The electronic device may comprise a positioning module that determines geographical location information of the electronic device.

Figure 1:
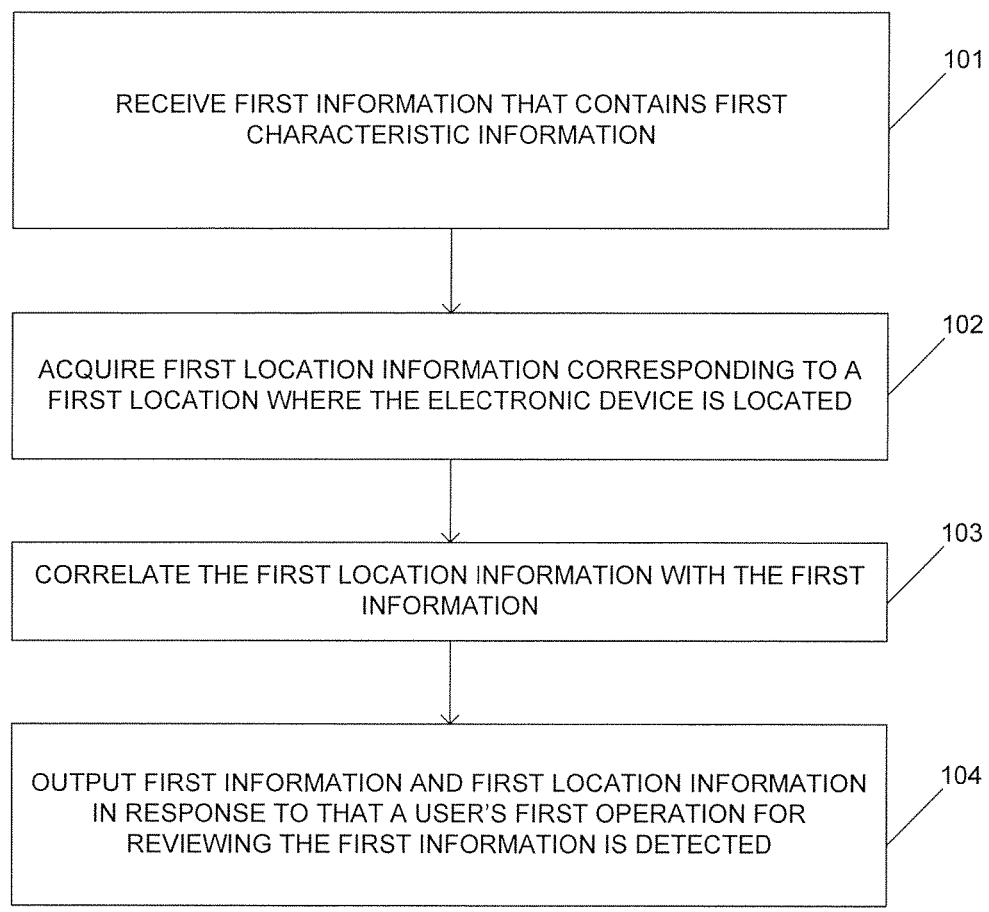
FIG. 1 is an illustrative flow diagram of an information processing method according to Embodiment 1 of the disclosure.

Referring to FIG. 1, this method comprises steps as follows.

S101: receiving first information that contains first characteristic information.

Particularly, in the step 101, the first information may be text messages, voice messages, or encoded information such as two-dimensional code, etc., and the first characteristic information is the characteristic information contained in the first information, such as key words, identifiers, characteristic codes, etc.

S102: acquiring first location information corresponding to a first location where the electronic device is located.

Particularly, the first location information may be acquired by a positioning module in the electronic device. The way by which the positioning module positions the electronic device comprises: the first one of positioning by a Global Positioning System (GPS); the second one of determining communication base stations or wireless hot points adjacent to the electronic device, and then determining the location of the electronic device by the network of the communication base stations or the wireless hot points; and the third one of combining the above two schemes. Embodiments of the disclosure will not make limitation to the specific way.

S103: correlating the first location information with the first information.

Particularly, the way by which the first location information is correlated with the first information comprises: the first one of inserting (writing) the first location information into the first information directly; the second one of providing a field of an attribution about location information in the first information, and adding the first location information to the field of the attribution; and the third one of correlating the storage path of the first location information with the first information, thereby the first location information can be accessed when accessing the first information.

S104: outputting the first information and the first location information in response to that a user's first operation for reviewing the first information is detected.

Particularly, due to the correlation of the first location information and the first information, when a user reviews the first information, the electronic device can output the first location information correlated with the first information.

The above technical solution according to an embodiment of the disclosure will be explained by taking a user shopping with a credit card and receiving notification from a bank as an example.

At first, when a user shops with a credit card, the bank will send the user notification (i.e. the first information), such as "your credit card with the last four numbers being ** spent XX dollars at xx (month), xx (day). [ Bank]." Such notification contains only the time and the amount of change so that the user may probably forget where he/she shopped and what was bought, after a period of time.

Then the electronic device will determine, according to the first characteristic information in the information, that the information is specific information with which location information needs to be correlated. Here assume that the first characteristic information is "bank" or "dollar."

Further, the electronic device acquires first location information about where the electronic device is located. The electronic device correlates a notification with the first location information so that a user, when reviewing the notification information, can acquire the location information if the information was received and the location where the consumption activity occurred. With the location information, the user may more easily know at which shop the consumption occurred and what was bought.

The above example is used only to exemplify the solution according to an embodiment of the disclosure, rather than limit the disclosure scope thereof. Other examples of the solution according to the embodiment of the disclosure comprises, for example: if the first characteristic information is the name of a people, the solution according to the embodiment of the disclosure may be used to correlate interactive information with the location information if a user made an information interaction with a specific user, to assist the former user to know the location of the user when the information interaction was in process. Other examples will not be enumerated here for simplicity.

In the above solution according to the embodiments of the disclosure, the potential technical problem that it is hard for a user to know, from specific information received by the electronic device, details of an event correlated with the information is addressed by obtaining first location information of an electronic device when the electronic device receives first information that comprises the first characteristic information and correlating the first location information with the first information, and thus enabling, with the first location information, the user to know the details of the event correlated with the first information.

Figure 2:
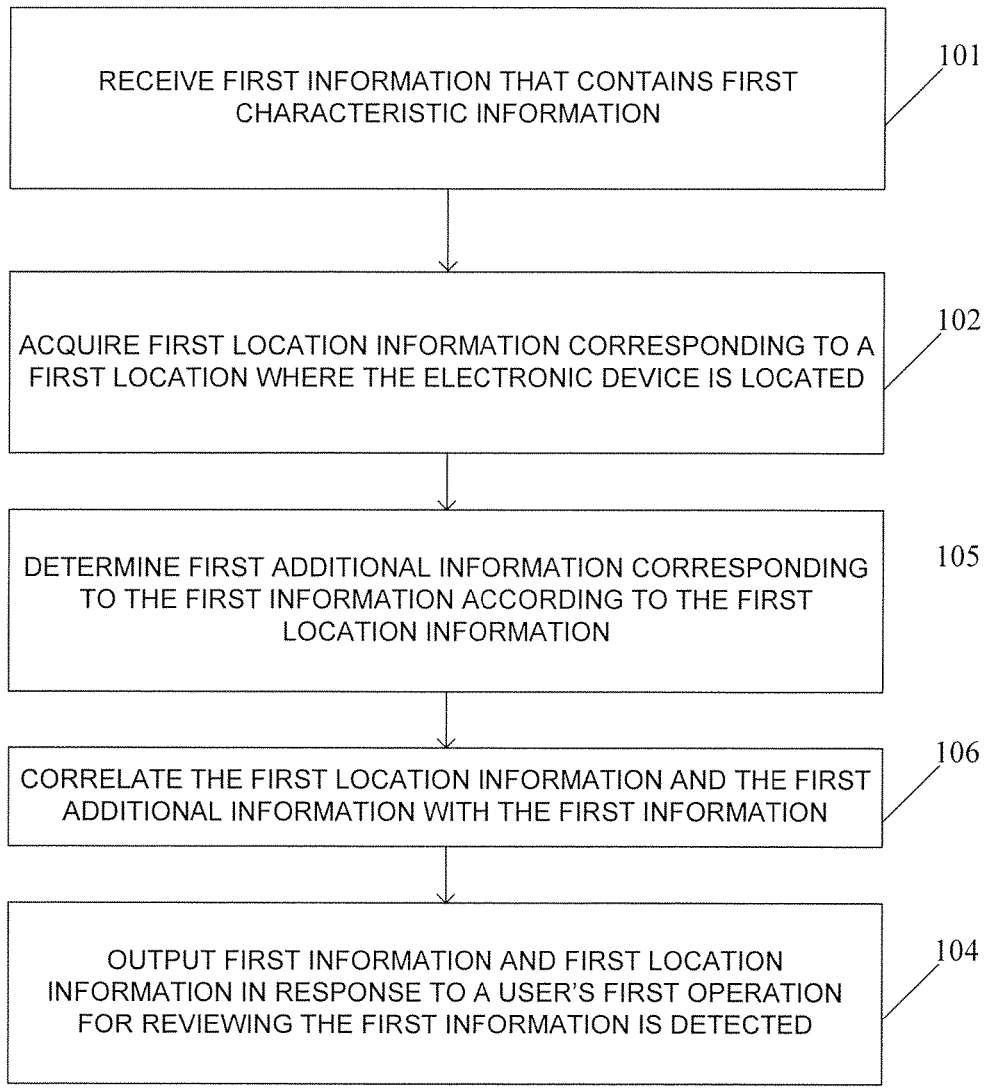
FIG. 2 is another illustrative flow diagram of an information processing method according to Embodiment 1 of the disclosure.

Furthermore, referring to FIG. 2, step 103 of correlating the first location information with the first information comprises:

S105: determining first additional information corresponding to the first information according to the first location information, wherein the first additional information comprises information related to a first agency; and S106: correlating the first location information and the first additional information with the first information.

Particularly, in step 105, the first agency is the agency involved in the event correlated with the first information. In the above mentioned example that the user shops with a credit card, a mall where the user shops is the first agency; or when the user withdraws cash from an Automatic Teller Machine (ATM), the branch of the Bank where the ATM belongs is the first agency. The first additional information comprises information related to the first agency. In addition to the information related to the first agency, the first additional information may further comprise other additional information, such as the weather of the area where the user was located when the first information was received, a location track of the user recorded by a geographical location recording application within a defined time period about the time at which the first information was received, an image taken by a camera of the electronic device when the first information was received, etc.

In step 103, not only the first location information is correlated with the first information, but also the first additional information will be correlated with the first information, so that the additional information with rich information (such as the information related to the first agency, the weather when the first information was received, the information of the image taken when the first information was received, etc.) can be used to enable the user to know the details of the event correlated with the first information.

In a particular implementation, the way by which the first additional information is correlated with the first information is similar with that for correlating the first location information with the first information as previously mentioned, and thus is omitted in the embodiment of the disclosure.

Furthermore, in an embodiment of the present disclosure, when a user performs a first operation of reviewing the first information, the electronic device may not display the first additional information directly, and instead displays the first additional information only if the user performs a related operation of reviewing the first additional information so that the user can review the first additional information, but the interface for outputting the first information is kept to be clean.

Further, step 104 of outputting the first information and the first location information in response to that a user's first operation for reviewing the first information is detected comprises:

outputting the first information, the first location information and the first additional information in response to that the first operation is detected.

Particularly, in the embodiment, when the user performs the first operation of reviewing the first information, the electronic device will display the first information, the first location information and the first additional information together, to provide the user with intuitive and detailed information and enable the user to know the details of the event correlated with the first information.

Figure 3:
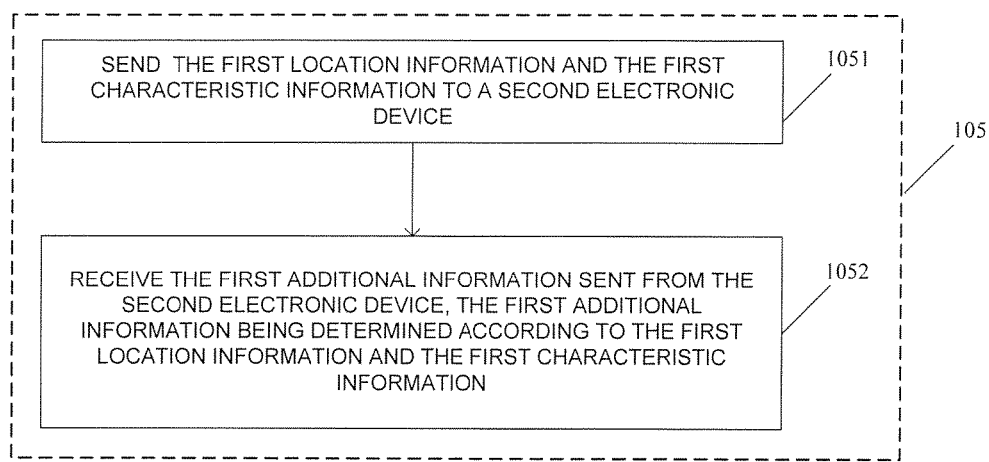
FIG. 3 is a detailed illustrative diagram of a step 105 according to Embodiment 1 of the disclosure.

Further, referring to FIG. 3, step 105 of determining first additional information corresponding to the first information according to the first location information comprises:

S1051: sending the first location information and the first characteristic information to a second electronic device; and S1052: receiving the first additional information sent from the second electronic device, wherein the first additional information is determined by the second electronic device according to the first location information and the first characteristic information.

Particularly, the electronic device may send the first location information and the first characteristic information to the second electronic device which performs related calculations to determine the first additional information. Then the second electronic device sends the result of the calculations to the electronic device. Therefore, in the case the electronic device has a limited calculation capability, the calculation operations can be conducted with the help of the second electronic device which has a stronger calculation capability.

In an embodiment of the disclosure, the second electronic device may be a related device of a cloud server, or an electronic device capable of communicating with the first electronic device. For example, in the case that the electronic device is a mobile phone, the second electronic device may be a notebook computer that has established a communication link with the mobile phone.

The second electronic device can determine the first additional information by means of a related database (such as a map database, a weather database, a location tracking database, etc.) after it received the first location information and the first characteristic information.

Figure 4:
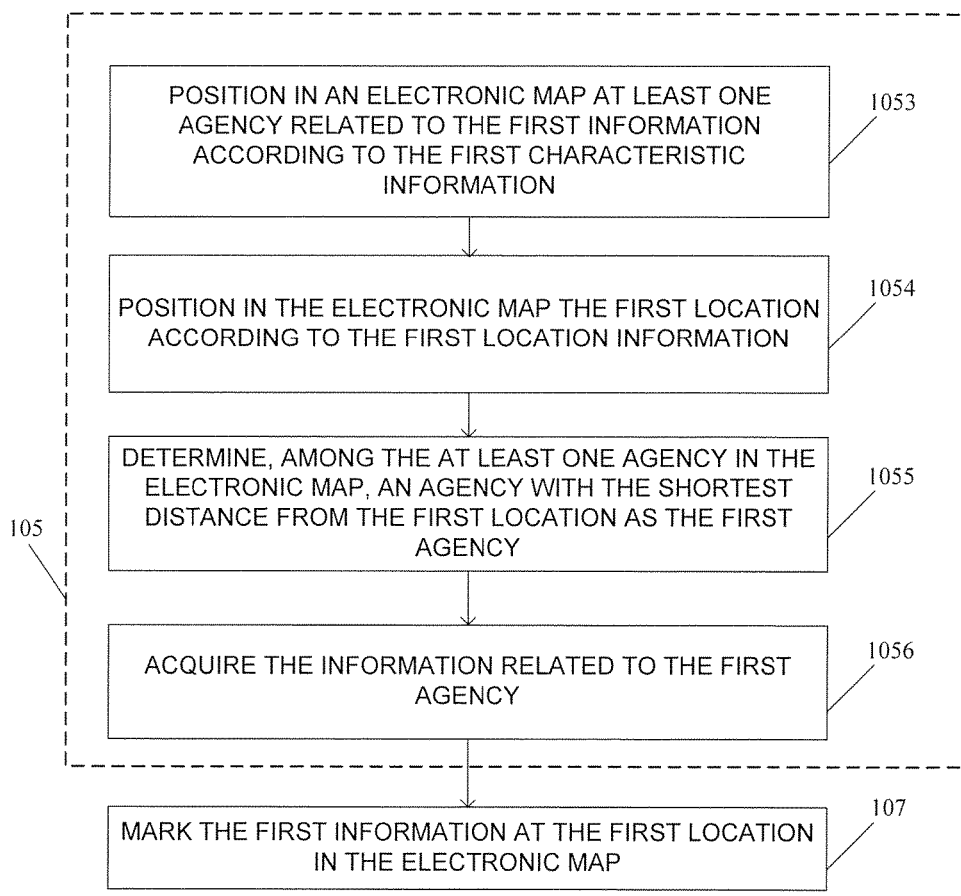
FIG. 4 is another detailed illustrative diagram of the step 105 according to Embodiment 1 of the disclosure.

Further, referring to FIG. 4, step 105 of determining first additional information corresponding to the first information according to the first location information comprises:

S1053: positioning in an electronic map at least one agency related to the first information according to the first characteristic information.

Particularly, in step 1053, the electronic map may be a local electronic map on the electronic device, or may be an electronic map on the other electronic devices which can be accessed by the electronic device in manner of shared access or invoking request. The electronic device can determine at least one branch of the agency related to the first information by searching the first characteristic information related to the agency.

For example, when a user withdraws cash from an ATM and receives the first information, the first characteristic information contains information similar as "XX Bank." A plurality of branches of the XX Bank and ATMs set by the XX Bank can be searched in the electronic map with the characteristic information such as "XX Bank." As another example, when a user consumes in a supermarket using a score card and receives the first information that comprises information e.g., "XX Supermarket." Every branch of the supermarket can be searched in the electronic map with the information "XX Supermarket."

S1054: positioning in the electronic map the first location according to the first location information.

S1055: determining, among the at least one agency in the electronic map, an agency with the shortest distance from the first location as the first agency.

Particularly, after positioning in the electronic map the first location in step 1054, in step 1055, the electronic device can determine, according to the first location, an agency with the shortest distance from the first location as the first agency.

For example, as in the previous instances, a branch of the bank which has the shortest distance from the first location may be determined as the first agency, or a branch of the supermarket which has the shortest distance from the first location may be determined as the first agency.

S1056: acquiring information related to the first agency.

Particularly, the electronic device will store the information related to the first agency that is determined with the electronic map.

In a detailed implementation, the electronic device can also determine additional information such as the previous mentioned weather information, user moving track, etc. by related applications. Other examples will not be enumerated here for simplicity.

Based on the above fact, the electronic device can determine the first additional information by using its own calculation capability and invoking local resources, so that more related information can be correlated with the first information to enable the user to know the details of the event correlated with the first information.

Further, the reference to FIG. 4, after step 1056 of acquiring the information related to the first agency, the method further comprises:

S107: marking the first information at the first location in the electronic map.

Particularly, the electronic device may mark the first information at the first location in the electronic map so that the user can view the first information on the interface of the electronic map. The display location of the first information depends on the location of the first location in the electronic map, so that the user may intuitively and unambiguously know where the user was located when the first information was received.

Figure 5:
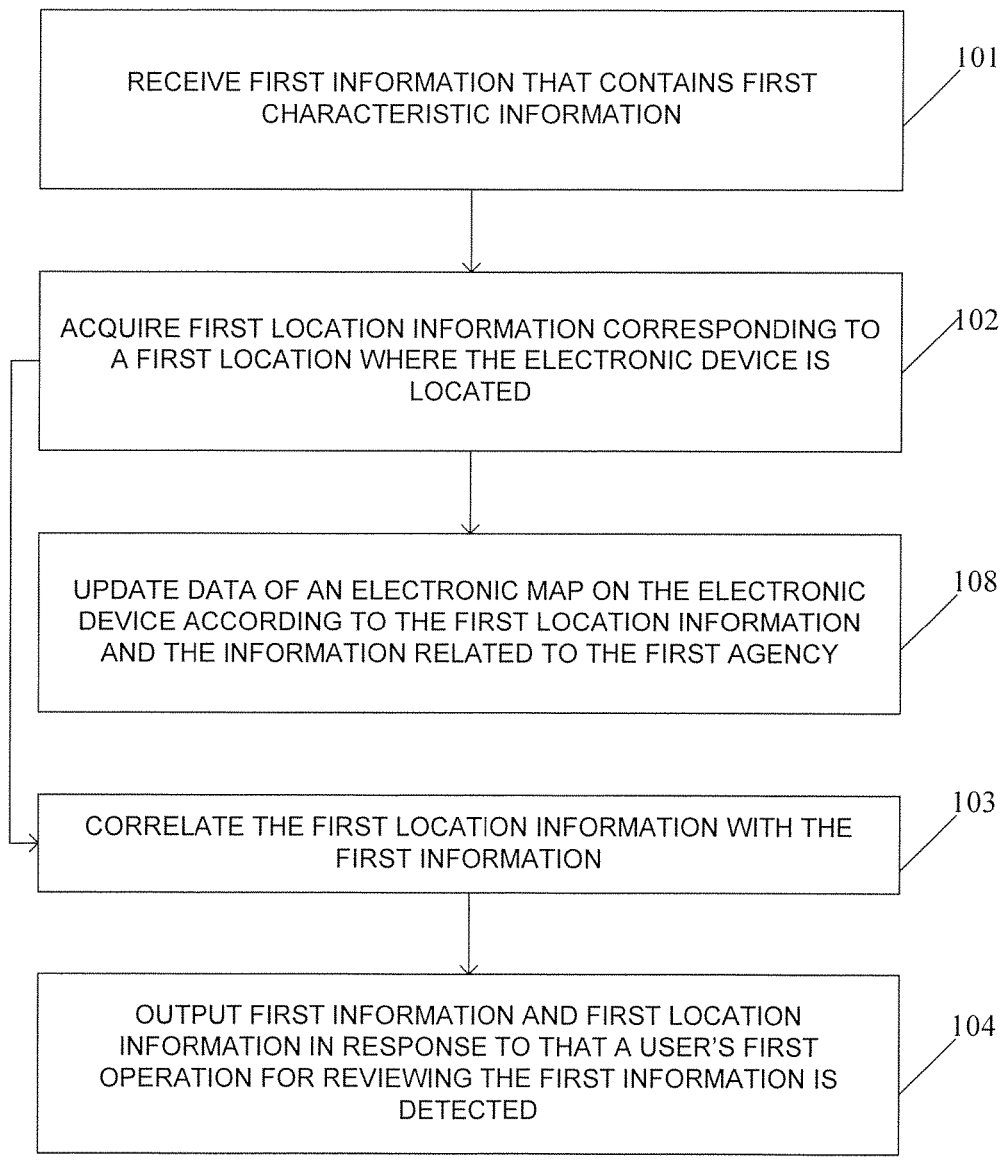
FIG. 5 is a further illustrative flow diagram of an information processing method according to Embodiment 1 of the disclosure.

Further, referring to FIG. 5, after step 102 of acquiring first location information corresponding to a first location where the electronic device is located, the method further comprises:

S108: updating data of an electronic map on the electronic device according to the first location information and the information related to the first agency.

Particularly, when the first information itself contains the information related to the first agency, for example "you withdrew XX dollars at XX branch of XX bank," the electronic device may now update data of the local electronic map on the electronic device with the acquired first location information, so that the first location information in the electronic map matches the information related to the first agency, thereby improving or optimizing data information contained in the electronic map.

In a detailed implementation, the electronic map may not be local on the electronic device, but instead on a second electronic device capable of communicating with the electronic device. When the electronic device performs a data update on the electronic map, it may perform the data update directly, or may send to the second electronic device an update request or the data need to be updated so that the second electronic device performs the data update instead.

Further, step 108 of updating data of an electronic map on the electronic device according to the first location information and the information related to the first agency comprises:

determining whether the information related to the first agency in the electronic map matches the first location information or not; and updating the location of the first agency in the electronic map to the first location if the information related the first agency in the electronic map does not match the first location information.

Particularly, the electronic device performs a map data update only if the information related to the first agency in the electronic map does not match the first location information, so that the system overhead may be reduced.

Embodiment 2

Corresponding to the information processing method in Embodiment 1, Embodiment 2 of the disclosure provides an electronic device which may be a smart phone, a tablet computer, a smart watch, etc. The electronic device may comprise a positioning module configured to determine the geographical location information of the electronic device.

Figure 6:
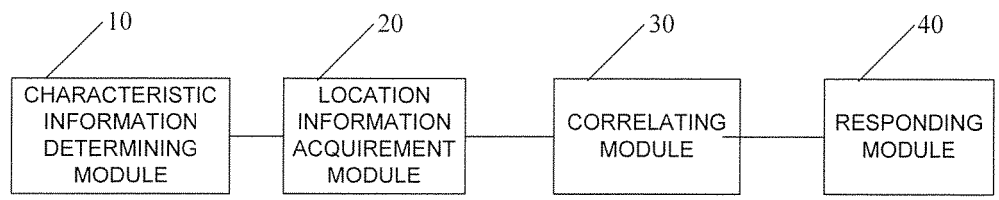
FIG. 6 is a functional block diagram of an electronic device according to Embodiment 2 of the disclosure.

Referring to FIG. 6, the electronic device comprises:

a characteristic information determining module 10 configured to determine whether first information received by the electronic device contains first characteristic information or not;

a location information acquiring module 20 configured to acquire, by e.g., the positioning module of the electronic device, first location information corresponding to a first location where the electronic device is located;

a correlating module 30 configured to correlate the first location information with the first information; and a responding module 40 configured to output the first information and the first location information in response to that a first operation for reviewing the first information is detected.

In the above solution according to the embodiment of the disclosure, the potential technical problem that it is hard for a user to know, from specific information received by the electronic device, details of an event correlated with the information is addressed by obtaining first location information of an electronic device when the electronic device receives first information that comprises the first characteristic information and correlating the first location information with the first information, and thus enabling, with the first location information, the user to know the details of the event correlated with the first information.

Figure 7:
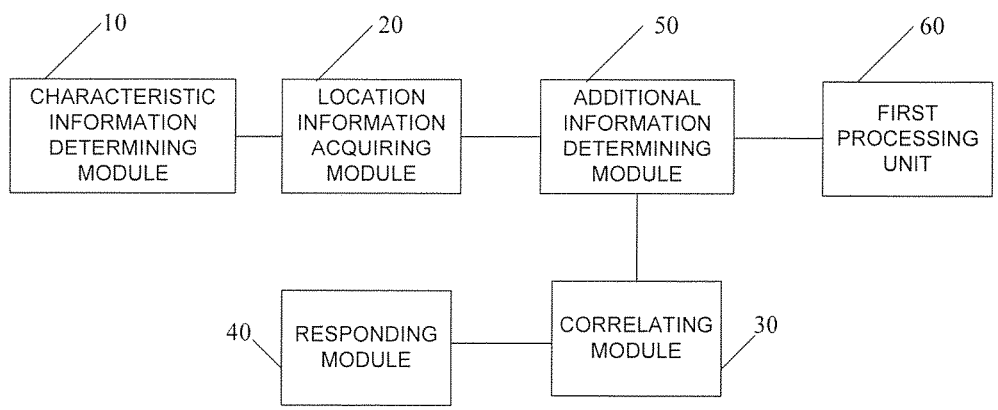
FIG. 7 is another functional block diagram of an electronic device according to Embodiment 2 of the disclosure.

Further, referring to FIG. 7, the electronic device also comprises:

an additional information determining module 50 configured to determine first additional information corresponding to the first information according to the first location information, wherein the first additional information comprises information related to a first agency.

the correlating module 30 is further configured to correlate the first additional information with the first information.

Further, the responding module 40 is further configured to output the first information, the first location information and the first additional information in response to that the first operation is detected.

Figure 8:
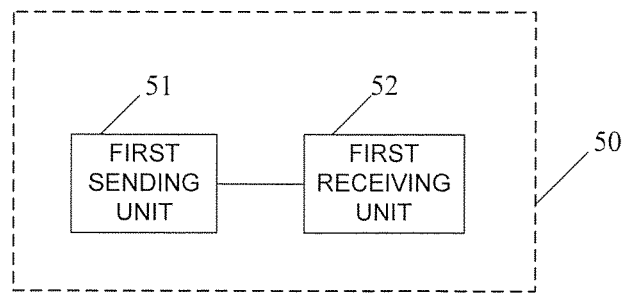
FIG. 8 is a detailed illustrative block diagram of an additional information determining module 50 according to Embodiment 2 of the disclosure.

Further, referring to FIG. 8, the additional information determining module 50 comprises:

a first sending unit 51 configured to send to a second electronic device the first location information and the first characteristic information; and a first receiving unit 52 configured to receive the first additional information sent from the second electronic device, wherein the first additional information is determined by the second electronic device according to the first location information and the first characteristic information.

Figure 9:
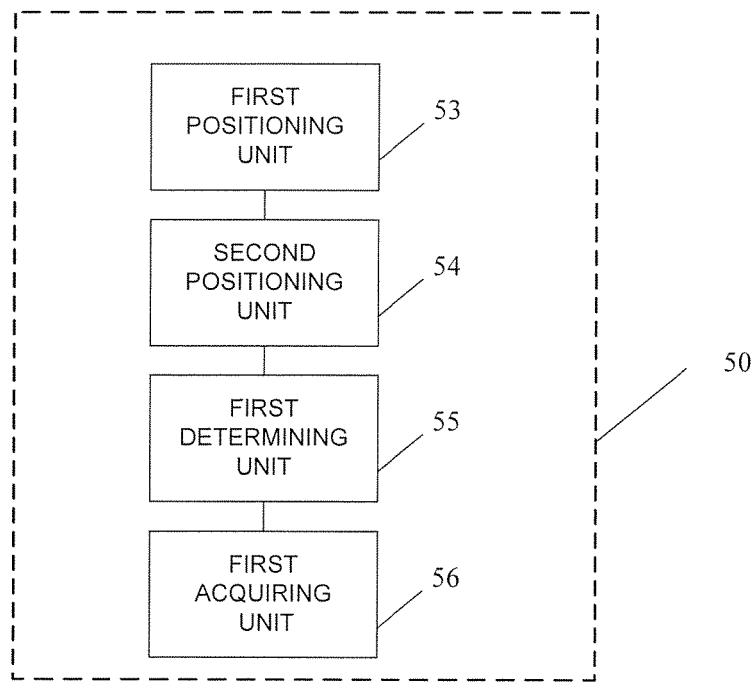
FIG. 9 is another detailed illustrative block diagram of an additional information determining module 50 according to Embodiment 2 of the disclosure.

Further, referring to FIG. 9, the additional information determining module 50 comprises:

a first positioning unit 53 configured to position in an electronic map at least one agency related to the first information according to the first characteristic information;

a second positioning unit 54 configured to position in the electronic map the first location according to the first location information;

a first determining unit 55 configured to determine, among the at least one agency in the electronic map, an agency with the shortest distance from the first location as the first agency; and a first acquiring unit 56 configured to acquire the information related to the first agency.

Further, reference to FIG. 7, the electronic device further comprises:

a first processing unit 60 configured to mark the first information at the first location in the electronic map.

Figure 10:
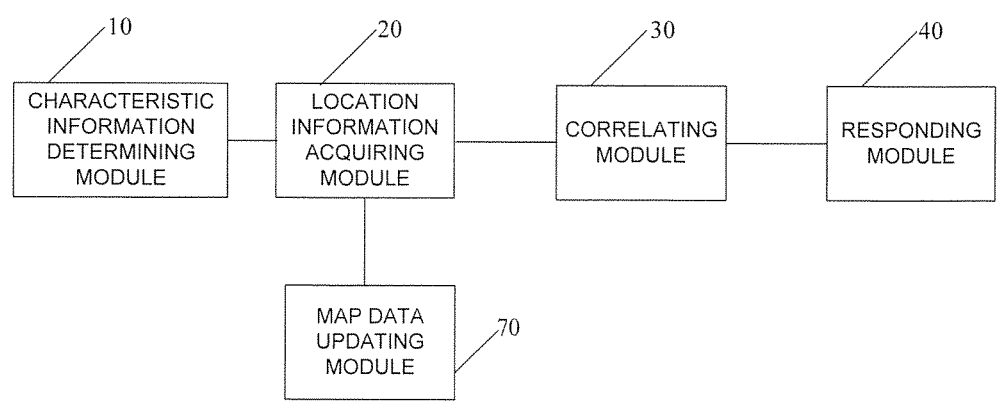
FIG. 10 is another functional block diagram of an electronic device according to Embodiment 2 of the disclosure.

Further, referring to FIG. 10, the electronic device further comprises:

a map data updating module 70 configured to update data of an electronic map on the electronic device according to the first location information and the information related to the first agency.

Further, the map data updating module 70 comprises:

a second determining unit configured to determine whether the information related to the first agency in the electronic map matches the first location information or not; and a first updating unit configured to update the location of the first agency in the electronic map to the first location if the information related to the first agency in the electronic map does not match the first location information.

Each scheme for processing information in the information processing method of the previously mentioned embodiment and the particular instances thereof are equally applicable to the electronic device of the present embodiment. From the detailed description of the information processing method in the previously mentioned embodiment, one with ordinary skills in the art can unambiguously understand the implementation of the electronic device of the present embodiment, and thus its detailed description will not be provided herein for simplicity.

The one or more solutions provided according to the embodiments of the disclosure have at least the following technical effects or advantages. In the embodiments of the disclosure, the potential technical problem that it is hard for a user to know, from specific information received by the electronic device, details of an event correlated with the information is addressed by obtaining first location information of an electronic device when the electronic device receives first information that comprises the first characteristic information and correlating the first location information with the first information, and thus enabling, with the first location information, the user to know the details of the event correlated with the first information.

One with ordinary skills in the art should understand that the embodiments of the disclosure can be provided as methods, systems or computer program products. Accordingly, the disclosure may take the form of full hardware embodiment, full software embodiment or embodiment combining software and hardware aspects. Furthermore, the disclosure may take the form of computer program product implemented on one or more computer-usable storage medium (comprises but do not limit to magnetic disks, CD-ROM, optical memories, etc.) having computer-usable program code embodied thereon.

The disclosure was described referring to the flowcharts and/or block diagrams of the methods, the devices (systems), and the computer program products according to the embodiment of the disclosure. It should be understood that each flow and/or block in the flowcharts and/or block diagrams, and the combination of the flows and/or blocks in the flowcharts and/or block diagrams may be implemented by computer program instructions. These computer program instructions may be provided to a general purpose computer, a special purpose computer, a embedded processor or the processors of other programmable data processing devices to product a machine, so that the instructions executed by the computers or the processors of other programmable data processing devices produce an apparatus for implementing the functions specified in one or more flows in the flowcharts and/or one or more blocks in the block diagrams.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in one or more flows in the flowcharts and/or one or more blocks in the block diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the function specified in one or more flows in the flowcharts and/or one or more blocks in the block diagrams.

Particularly, the computer program instructions corresponding to the information processing method according to the embodiment of the disclosure may be stored on storage medium such as optical disc, hard disc, USB flash disc, and so on. When the computer program instructions in the storage medium which corresponds to the information processing method are read or performed by an electronic device, the following operations are performed, comprising:

determining whether first information received by the electronic device contains first characteristic information or not;

acquiring first location information corresponding to a first location where the electronic device is located if the first information contains first characteristic information;

correlating the first location information with the first information; and outputting, the first information and the first location information in response to that a first operation for reviewing the first information is detected.

Optionally, the storage medium further stores thereon other computer instructions which are executed before executing the computer instructions corresponding to the operation of correlating the first location information with the first information, and the following operations are performed when the other computer instructions are executed: determining first additional information corresponding to the first information according to the first location information, wherein the first additional information comprises information related to a first agency.

The computer instructions stored in the storage medium and corresponding to the operation of correlating the first location information with the first information, when executed, perform the following operation: correlating the first location information and the first additional information with the first information.

Optionally, the computer instructions stored in the storage medium and corresponding to the operation of outputting the first information and the first location information in response to that a first operation for reviewing the first information is detected, when executed, perform the following operation:

outputting the first information, the first location information and the first additional information in response to that the first operation is detected.

Optionally, the computer instructions stored in the storage medium and corresponding to the operation of determining first additional information corresponding to the first information according to the first location information, when executed, perform the following operation:

sending the first location information and the first characteristic information to a second electronic device; and receiving the first additional information sent from the second electronic device, wherein the first additional information is determined according to the first location information and the first characteristic information.

Optionally, the computer instructions stored in the storage medium and corresponding to the operation of determining first additional information corresponding to the first information according to the first location information, when executed, perform the following operation:

positioning in an electronic map at least one agency related to the first information according to the first characteristic information;

positioning in the electronic map the first location according to the first location information;

determining, among the at least one agency in the electronic map, an agency with the shortest distance from the first location as the first agency; and acquiring the information related to the first agency.

Optionally, the storage medium further stores thereon other computer instructions which are executed after executing the computer instructions corresponding to the operation of acquiring the information related to the first agency, which when executed, perform the following operation: marking the first information at the first location in the electronic map.

Optionally, when the first information contains the information related to the first agency, the storage medium further stores thereon other computer instructions which are executed after executing the computer instructions corresponding to the operation of acquiring first location information corresponding to a first location where the electronic device is located, which when executed, perform the following operation:

updating data of an electronic map on the electronic device according to the first location information and the information related to the first agency.

Optionally, the computer instructions stored in the storage medium and corresponding to the operation of updating data of an electronic map on the electronic device according to the first location information and the information related to the first agency, when executed, perform the following operation:

determining whether the information related to the first agency in the electronic map matches the first location information or not; and updating the location of the first agency in the electronic map to the first location if the information related to the first agency in the electronic map does not with the first location information.

Though the preferable embodiments of the disclosure have been described, other alterations and modifications can be made once one with ordinary skills in the art knows the basic inventive concept. Therefore, the appended claims should be interpreted as including the preferable embodiments and all the alterations and modifications falling into the scope of the disclosure.

Obviously, one with ordinary skills in the art can make alterations and modifications without departing from the spirit and scope of the disclosure. As such, if these alterations and modifications of the disclosure fall into the scope of the claims of the disclosure and equivalents thereof, the disclosure intends to contain these alterations and modifications.

I claim:

1. An information processing method for use in an electronic device, the method comprises:

receiving, by the electronic device, first information;

acquiring, by a positioning module in the electronic device, a first location in an electronic map where the electronic device is located as the location where a financial transaction occurred, when the first information including a message or a code identifying the a financial transaction conducted by a user of the electronic device does not contain the location where the financial transaction occurred;

positioning, by the positioning module in the electronic device, at least one agency in the electronic map based on the first information:

determining, by the electronic device, an agency with the shortest distance from the first location among the at least one agency in the electronic map as the first agency: acquiring, by the electronic device, first additional information comprises information of the first agency:

storing, by the electronic device, the first location, the first information and the first additional information: and displaying, by the electronic device, the first location along with the first information in response to detecting a first operation for reviewing the first information wherein storing the first location, the first information and the first additional information comprises inserting the first location and the first additional information into the first information.

2. The method of claim 1, wherein said displaying comprises:

displaying the first information, the first location and the first additional information in response to that the first operation is detected.

3. The method of claim 1, wherein said determining first additional information corresponding to the first information according to the first location comprises:

sending the first location and the first characteristic information to a second electronic device; and receiving the first additional information from the second electronic device, wherein the first additional information is determined according to the first location and the first characteristic information.

4. The method of claim 1, wherein after acquiring the information related to the first agency, the method further comprises:

marking the first information at the first location in the electronic map.

5. The method of claim 1, further comprising:

updating data of the electronic map on the electronic device according to the first location and the information related to the first agency.

6. The method of claim 5, wherein said updating data of an electronic map comprises:

determining whether the information related to the first agency in the electronic map matches the first location or not; and updating a location of the first agency in the electronic map to the first location, if the information related to the first agency in the electronic map does not match the first location.

7. An electronic device comprising:

a characteristic information determining module, configured to receive a first information;

a positioning module, comprising:

a second positioning unit, configured to acquire a first location in an electronic map where the electronic device is located, as the location where a financial transaction occurred, when the first information including a message or a code identifying the financial transaction conducted by a user of the electronic device does not contain the location where the financial transaction occurred;

a first positioning unit configured to position at least one agency in the electronic map based on the first information:

a first acquiring unit configured to acquire first additional information comprises information of the first agency;

an associating module, configured to store the first location, the first information and the first additional information; and a responding module, configured to display the first location along with the first information in response to detecting a first operation for reviewing the first information^ wherein the associating module is configured to insert the first location and the first additional information into the first information.

8. The electronic device of claim 7, wherein the responding module is further configured to: output the first information, the first location and the first additional information in response to that the first operation is detected.

9. The electronic device of claim 7, wherein the additional information determining module comprises:

a first sending unit configured to send the first location and the first characteristic information to a second electronic device; and a first receiving unit configured to receive the first additional information from the second electronic device, wherein the first additional information is determined by the second electronic device according to the first location and the first characteristic information.

10. The electronic device of claim 1, further comprising:

a first processing unit configured to mark the first information at the first location in the electronic map.

11. The electronic device of claim 7, further comprising:

a map data updating module configured to update data of the electronic map on the electronic device according to the first location and the information related to the first agency.

12. The electronic device of claim 11, wherein the map data updating module comprises:

a second determining unit configured to determine whether the information related to the first agency in the electronic map matches the first location or not; and a first updating unit configured to update location of the first agency in the electronic map to the first location, if the information related to the first agency in the electronic map does not match the first location.

13. An information processing method for use in an electronic device, the method comprises:

receiving, by the electronic device, a first information relating to a financial transaction;

acquiring, by a positioning module in the electronic device, a first location in an electronic map where the electronic device is located as the location where the financial transaction occurred, when the first information including a message or a code identifying the financial transaction conducted by a user of the electronic device does not contain the location where the financial transaction occurred;

positioning, by the positioning module in the electronic device, at least one shop in the electronic map based on the first information;

determining, by the electronic device, the shop with the shortest distance from the first location among a plurality of shops in the electronic map;

acquiring, by the electronic device, a first additional information identifying the shop or related to the date of the financial transaction or the first location; storing, by the electronic device, the first location, the first information and the first additional information; and displaying, by the electronic device, the first location along with the first information and the first additional information in response to detecting the user reviewing the first information.

* * * * *